United States Patent [19]
Robinson

[11] Patent Number: 5,396,975
[45] Date of Patent: Mar. 14, 1995

[54] REVERSIBLE CLUTCH JAW

[75] Inventor: Michael A. Robinson, West Unity, Ohio

[73] Assignee: Ingersoll-Rand Company, Woodcliff Lake, N.J.

[21] Appl. No.: 51,427

[22] Filed: Apr. 23, 1993

[51] Int. Cl.⁶ .......................................... F16D 11/00
[52] U.S. Cl. .................................. 192/67 R; 192/108; 192/DIG. 1
[58] Field of Search ........... 192/34, 108, 67 R, 111 R, 192/DIG. 1

[56] References Cited

U.S. PATENT DOCUMENTS

| | | | |
|---|---|---|---|
| 1,396,074 | 11/1921 | Stumpenhorst | 192/108 X |
| 1,907,619 | 5/1933 | Soden-Fraunhofen | 192/108 X |
| 1,913,046 | 6/1933 | Callan | 192/108 X |
| 2,755,900 | 7/1956 | Seyfried | 192/108 X |
| 3,780,840 | 12/1973 | Thomas | 192/108 X |
| 3,834,252 | 9/1974 | Abell et al. | 192/108 X |

FOREIGN PATENT DOCUMENTS

| | | | |
|---|---|---|---|
| 366703 | 1/1939 | Italy | 192/108 |
| 0120429 | 5/1989 | Japan | 192/67 R |

*Primary Examiner*—Rodney H. Bonck
*Attorney, Agent, or Firm*—Walter C. Vliet

[57] ABSTRACT

A power transmission clutch for power tools having interacting interchangeable and reversing replaceable identical clutch elements which essentially double the clutch part life and permit ready repair without additional parts.

8 Claims, 1 Drawing Sheet

REVERSIBLE CLUTCH JAW

BACKGROUND OF THE INVENTION

This invention relates generally to power transmission clutches and more particularly to a drive clutch for hand held power tools such as electric or pneumatically driven screwdrivers or the like.

Typically, such clutch mechanisms utilize a clutch jaw which is integrated with the drive spindle or the driven spindle. When the clutch jaws becomes unserviceable after use, such construction dictates the replacement of the entire part which, with the exception of the jaws, may be in otherwise serviceable condition. For this reason, replaceable independent jaws have been suggested in the prior art. However, such replaceable jaws still required disassembly and complete replacement of the jaws when service is required.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a reversible clutch jaw for alternatively mounting on a drive spindle and an output spindle comprising a disc having a drive bore means for alternatively cooperating with the drive spindle and the output spindle; the disc being further provided with similar cooperating jaw faces on the face of each side of the disc for alternative driving engagement with the drive spindle or the output spindle and a like disc alternatively mounted to form a power transmission clutch.

The foregoing and other aspects will become apparent from the following detailed description of the invention when considered in conjunction with the accompanying drawing figures.

BRIEF DESCRIPTION OF THE DRAWING FIGURES

FIG. 1 is a cross section of a final drive and clutch assembly for a pneumatic screwdriver or the like;

DETAILED DESCRIPTION

Figure 1:
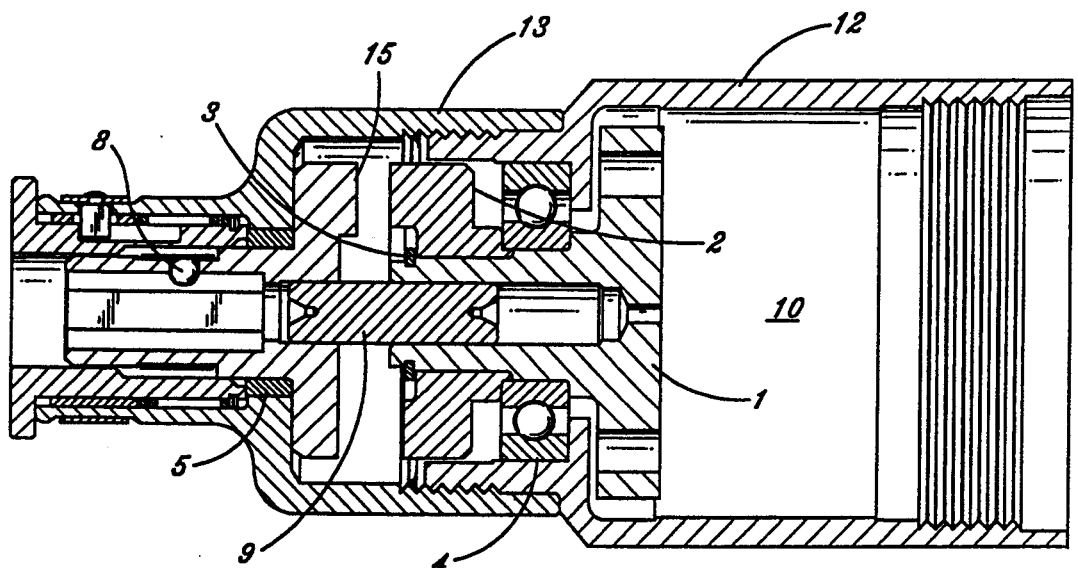

Referring to FIG. 1, the final drive section of a typical pneumatic screwdriver is shown and generally designated by the reference numeral 10. A front or driven jaw 15 is shown integrated with a screwdriver bit holder 5 to form one complete part as shown. A rear or driven clutch jaw 2 is shown attached to a drive spindle 1 by means of a retaining ring 3. A pilot shaft 9 is provided to assure rotational alignment of the clutch jaws in rotational engagement.

To better understand the clutch function, it should be understood that rotation of the drive spindle 1 causes rotation of the clutch jaw 2 via a hex drive by contact between the drive spindle 1 and the clutch jaw 2. The clutch jaw 2 is fastened to the drive spindle with a retaining ring 3 and shoulders against a ball bearing 4. The bit holder 5 is translated linearly due to force exerted by the tool operator to create the contact between the jaw clutch 2 and the front jaw 15. Upon contact, both the drive spindle 1 and the output spindle and bit holder 5 rotate together. When the jaw teeth wear sufficiently they begin to lose engagement and must be replaced to maintain the torsional output of the screwdriver.

The jaws, both front and rear, are designed in such a way that, when they wear out, the tool can be disassembled by unscrewing the clutch case 13 from the screwdriver housing 12 and the jaws replaced along with the necessary associated parts. In the prior art example shown, it is a fairly simple procedure to remove the retaining ring for the rear clutch jaw 2 and then remove the old jaw. To replace the rear jaw requires positioning a new jaw onto the driving spindle and replacing the retaining ring. To replace the front jaw, however, although the operation is not difficult to perform, it is a relatively expensive process. This is occasioned by the fact that when a worn front jaw is replaced, the bit holder 5 must also be replaced without regard to its condition. The spline and ball bit retainer 8, therefore, add to the cost of replacement. Generally, when the jaws require replacement, the bit holder feature of the driven spindle has very little wear.

Figure 2:
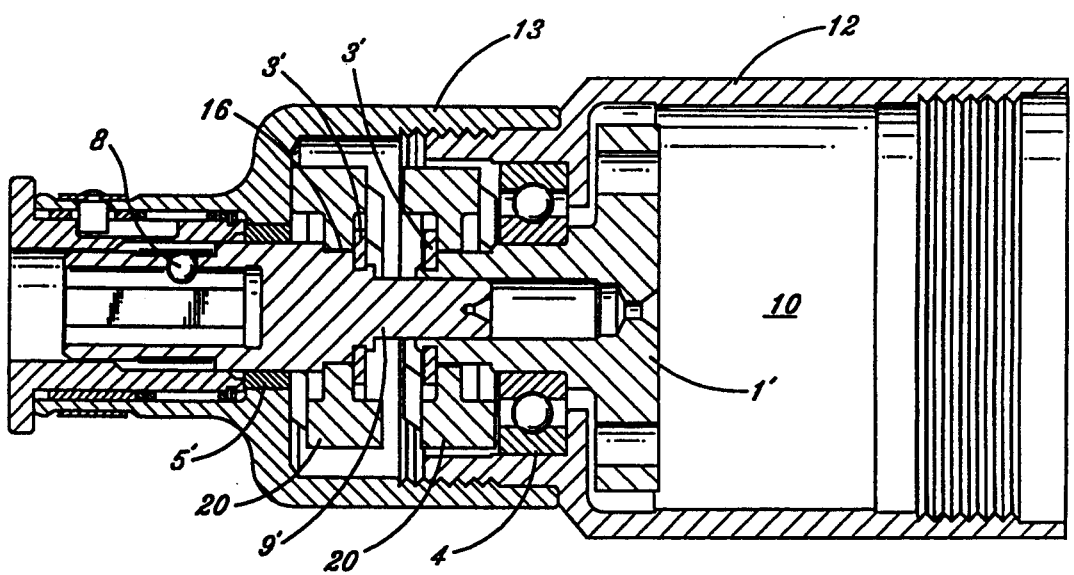
FIG. 2 is a cross section of a final drive section for a power screwdriver or the like according to the present invention.

Referring to FIG. 2, the clutch design according to the present invention operates much the same way as the prior art design. However, the clutch jaw 2 and the front jaw 15 have been replaced by a replaceable and reversible clutch jaw 20 (best seen in FIGS. 3–5). The new clutch jaw is inserted on the drive spindle 1' which is slightly modified to accept the disc-like reversible jaw. The jaw 20 is retained in place by means of a snap ring 3'. Likewise, a modified bit holder or output spindle 5' is provided with an integral pinion shaft 9' and a stepped land 16 to receive a reversible jaw 20 which is also held in place by a snap ring 3'.

The bit jaw holder assembly 5' uses the same reversible clutch jaw 20 as the drive spindle 1', thus creating an interchangeable jaw assembly. The unique feature of the jaw design is the fact that it utilizes jaw teeth on both sides of the jaw. This feature creates replacement parts for both front and rear jaws when the jaw teeth wear beyond use. When jaws require replacement, the tool is disassembled and the retaining ring is removed from the drive spindle and/or the bit holder 5'. The jaws are removed, turned around to present the other side for contact, and replaced onto its mating part. The retaining ring is then replaced. This replacement jaw design virtually doubles the life of the clutch jaws.

Figure 3:
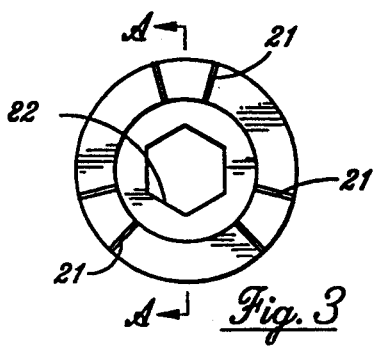
FIG. 3 is an end view of a reversible clutch jaw according to the present invention.
Figure 4:
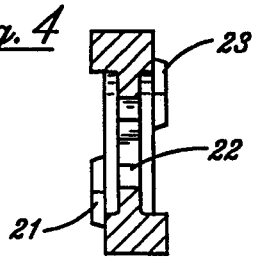
FIG. 4 is a cross section of a reversible clutch jaw according to the present invention taken at Section A—A of FIG. 3.
Figure 5:
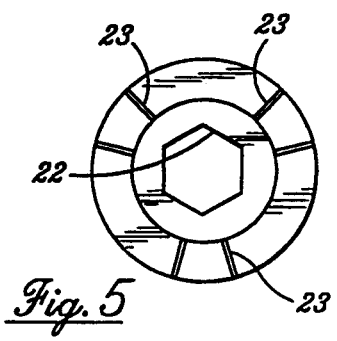
FIG. 5 is an opposite end view of a reversible clutch jaw according to the present invention.

Referring to FIGS. 3, 4, and 5, the reversible clutch jaw 20 is provided with projecting jaws 21 and 23 on opposed faces. The disc is provided with a hexagonal bore 22 which cooperates with the drive spindle or alternatively the output spindle/bit holder 5'.

A further feature of the present invention is the fact that the reversible clutch jaw may be manufactured in a powdered metal or coining operation. To facilitate this, the coacting jaws 21 and 23 are spaced about the disc face. In the embodiment shown the jaws 21 and 23 are spaced radially approximately 120 degree apart on each face and are offset relative each other on opposite faces by approximately 60 degree. This permits a better distribution and material flow in the manufacturing process and stiffens the clutch disc.

What is claimed is:

1. A reversible clutch jaw for a power transmission comprising:
   a disc having opposed faces and having a reversible drive bore means for alternatively mounting in driving engagement with a drive spindle or an output spindle;
   said disc being further provided with duplicate cooperating jaw faces on the face of each side of the disc, one of said jaw faces being a non-engageable spare face in normal operation until reverse mounted on its spindle; and
   said disc being further disposed on one of said drive spindle or said output spindle for selective driving engagement with a duplicate disc similarly disposed on the other of said drive spindle or said output spindle to form a power transmission clutch.

2. A reversible clutch jaw according to claim 1, wherein said drive bore means comprises a noncircular bore.

3. A reversible clutch jaw according to claim 1, wherein said jaw faces are surface projections.

4. A reversible clutch jaw according to claim 3, wherein said surface projections comprise a plurality of equally spaced projections radially positioned about the disc face.

5. A reversible clutch jaw according to claim 4, wherein said projections are angularly offset on opposite faces of said disc.

6. A reversible clutch jaw according to claim 4, wherein three projections are provided on each opposite face set 120 degrees apart.

7. A reversible clutch jaw according to claim 5, wherein said angular offset is 60 degrees.

8. A reversible clutch jaw according to claim 1, wherein each of the duplicate discs are removably mounted on said drive spindle or said output spindle and are reversible.

* * * * *